United States Patent [19]

Tuda et al.

[11] 4,383,455

[45] May 17, 1983

[54] ARM WITH GRAVITY-BALANCING FUNCTION

[75] Inventors: Goro Tuda; Osamu Mizuguchi, both of Kobe, Japan

[73] Assignee: Kobe Steel, Limited, Kobe, Japan

[21] Appl. No.: 198,132

[22] PCT Filed: Feb. 22, 1979

[86] PCT No.: PCT/JP79/00043

§ 371 Date: Oct. 21, 1980

§ 102(e) Date: Oct. 21, 1980

[87] PCT Pub. No.: WO80/01774

PCT Pub. Date: Sep. 4, 1980

[51] Int. Cl.³ .................. G05G 1/04; B25J 17/00
[52] U.S. Cl. .................. 74/469; 16/1 C; 248/123.1; 248/292.1; 414/1
[58] Field of Search ............ 74/469; 248/123.1, 292.1, 248/280, 571; 49/200; 160/191; 16/1 C; 414/1

[56] References Cited

U.S. PATENT DOCUMENTS

| | | | |
|---|---|---|---|
| 1,948,065 | 2/1934 | Clark | 160/191 X |
| 2,416,753 | 3/1947 | Hicks | 16/1 C |
| 2,436,006 | 2/1948 | Kaiser | 160/191 |
| 4,208,028 | 6/1980 | Brown et al. | 248/123.1 X |

FOREIGN PATENT DOCUMENTS

| | | |
|---|---|---|
| 2086976 | 12/1971 | France . |
| 50-111761 | 9/1975 | Japan . |
| 52-35066 | 3/1977 | Japan . |
| 52-27158 | 7/1977 | Japan . |
| 52-27159 | 8/1977 | Japan . |
| 1008917 | 11/1965 | United Kingdom .................. 49/200 |

Primary Examiner—Allan D. Herrmann
Attorney, Agent, or Firm—Oblon, Fisher, Spivak, McClelland & Maier

[57] ABSTRACT

Arm having a gravity-balancing function effective for use in welding robots as well as robots employed in a variety of industrial fields. Projectively provided over the fulcrum of an arm (1) is a rotary sheave (2), whose position is perpendicularly maintained regardless of the vertical swaying of the arm (1). A wire (6) is extended from an action point (A) on a line traced by the center of gravity of the arm (1), to the rotary sheave (2), and is connected to a spring mechanism (3) which may extend by the length of elongation equal to the distance between the action point (A) and the rotary sheave (2), whereby a moment due to the weight of the arm (1) is completely balanced to provide an arm with gravity-balancing.

2 Claims, 6 Drawing Figures

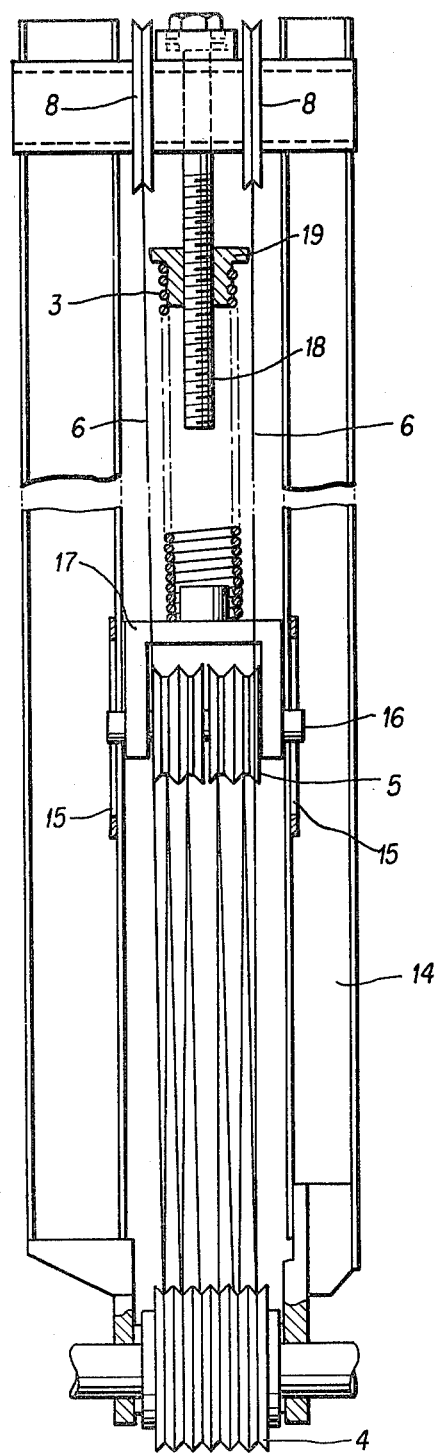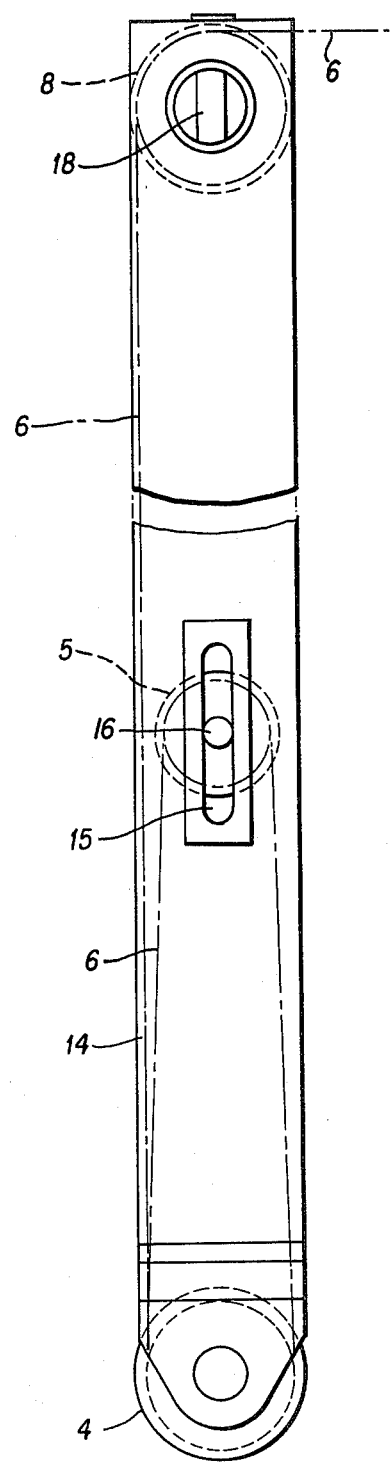
FIG. 5                    FIG. 6

ARM WITH GRAVITY-BALANCING FUNCTION

BACKGROUND OF THE INVENTION

This invention relates to an arm assembly with gravity-balancing function especially for use in the teaching and playback type of robots.

BRIEF DESCRIPTION OF THE PRIOR ART

It is conventional in the art of robots for welding or the like to previously store the trajectories of a movements within a memory unit by manual teaching operation. It is of course desirable that manual actuation of multiarticulation arms of robots require a minimum of force regardless of the direction of movements.

The arms of robots are generally of considerable weights so that they become lighter and heavier when moving downwardly and upwardly, respectively. Accordingly, there are problems that the arms exhibit uneven movements during manual teaching operation, thus deteriorating accuracy of reproduction in a servo control system. An exemplary arm assembly for use in industrial robots is disclosed in Japanese Patent unexamined publication No. 27158/1977 but unsatisfactory both theoretically and structurally with respect to its counterbalancing performance.

SUMMARY OF THE INVENTION

According to the present invention, there is provided a rotary sheave extending over the fulcrum of an arm, the rotary sheave being constantly held somewhere in a vertical plane regardless of the vertically oscillating movement of the arm. A wire extending between a working point on the center line of gravity of the arm is connected to a spring mechanism having a maximum expansion equal to the distance between the working point and the rotary sheave, thereby counterbalancing moment produced by the weight of the arm and thus ensuring wellbalanced moving behavior of the arm.

The spring mechanism in the thus improved arm embodying the present invention includes a plurality of fixed rotary sheaves and a spring member.

BRIEF DESCRIPTION OF THE DRAWINGS

FIG. 5 is a front view of an example of an articulation scheme according to the present invention with a part thereof omitted; and FIG. 6 is a plan view of the example of the articulation scheme of FIG. 5 with a part thereof omitted.

DETAILED DESCRIPTION OF THE PREFERRED EMBODIMENTS

Figure 1:
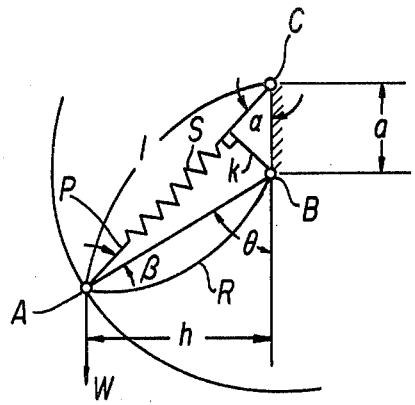
FIG. 1 is a diagram for explanation of the operating principles of an arm assembly according to the present invention.

Referring first to FIG. 1 there is shown a basic arrangement for counterbalancing the weight of an arm. The moment produced on the arm about a fulcrum B is represented by the following equation:

| downward | W × h |
| upward | P × K | where $\overline{AB}$ is the arm pivoted about the fixed fulcrum B, S is a spring extending between another joint C spaced at a small distance in a vertical direction from the fulcrum B and point A on the center of gravity of the arm $\overline{AB}$, W is the weight of the arm AB at an action point A on the gravity center, P is the tension of the spring S, K is the length of a perpendicular standing from the fulcrum B with respect to the line $\overline{AC}$ and h is the length of a perpendicular standing from the point A with respect to the line BC.

It is evident that balance condition is as follows:

$$W \times h = P \times K \ldots \quad (1)$$

The area of the triangle ABC is:

$$\tfrac{1}{2} a \times h = \tfrac{1}{2} l \times K \ldots \quad (2)$$

wherein l is the length of the spring.

Combining equation (1) and (2) to make the ratio therebetween, $$\frac{W \times h}{a \times h} = \frac{P \times K}{l \times K}$$

Thus, $$(W/a) = (P/l) = \text{constant} \quad (3)$$

Assuming that the spring tension (P) is proportional to the spring length (l), the link spring mechanism can keep its balance wherever it stands in a circumference. A spring whose spring constant meets the above requirements must have a free length of zero and does not exist as a matter of fact. By this reason for simple arrangement as discussed above it is not possible to achieve its intended purpose as a practical device.

In this connection nor does the arm disclosed in Japanese Patent unexamined publication No. 27158/1977 exhibit satisfactory counterbalancing performance. In other words, in the arm shown in Japanese Patent unexamined publication No. 27159/1977, a balance mechanism is suspended at a position corresponding to l in a straight line fashion so that its free length is more than zero.

Figure 2:
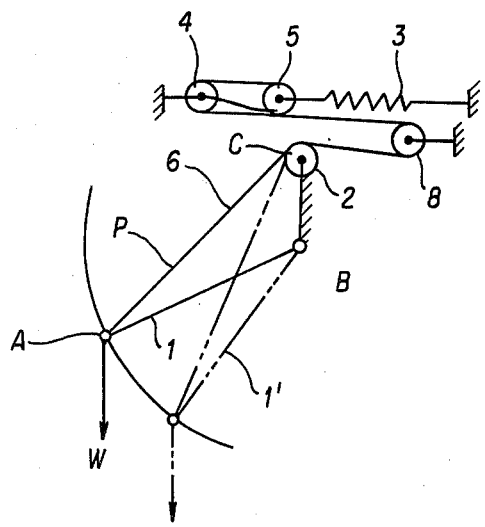
FIG. 2 is a skeleton diagram of a first stage arm assembly according to the present invention.

The present invention provides a spring mechanism which is capable of substantially satisfying the essential conditions as discussed above. As schematically illustrated in FIG. 2, the spring mechanism generally comprises an arm 1 rockingly movable in a vertical direction, a rotary sheave 2 pivoted about position C above the fulcrum B of the arm 1, a sheave chain including one or more fixed rotary sheaves 4 and 8 and a moving sheave 5 slidable in a horizontal direction, a spring member 3 extending between the moving sheave 5 and a fixing member and a wire 6 extending from position A on the center of gravity of the arm 1 through the rotary sheave 2 and the sheave chain.

In the above link spring mechanism the rotary sheave 2 as a support for the wire 6 has its axis displaced by its radius with respect to the joint of FIG. 1. Though the displacement causes error in the fundamental conditions explained with respect to FIG. 1, means is provided for offsetting such error as described hereinafter.

An appropriate spring constant of the link spring mechanism is necessary as follows:

$$q = (W/a)N^2$$

wherein q is the spring constant of the spring member 3 and N is the number of the wires 6 expanding and contracting when the arm assembly is in operation.

It is possible to counterbalance the fixed weight and gravity of the link spring mechanism regardless of the inclination of the arm 1 by proper selection of the spring constant of the spring member 3 and the number of the sheaves in the chain, which selection permits the link spring mechanism to bear the spring constant $(W/a)N^2$.

Reverting to FIG. 1, conditions for counterbalancing gravity can be represented by the following equations:

$$W \cdot R \sin \theta = P \cdot K$$

On the other hand, $$K = R \sin \beta \text{ and } l \sin \beta = a \sin \theta$$

Thus, $$K = R \cdot (a/l) \sin \theta$$

$$W \cdot R \sin \theta = R \cdot P(a/l) \sin \theta$$

$$P = Wl/a$$

Accordingly, P balances against W.

Figure 3:
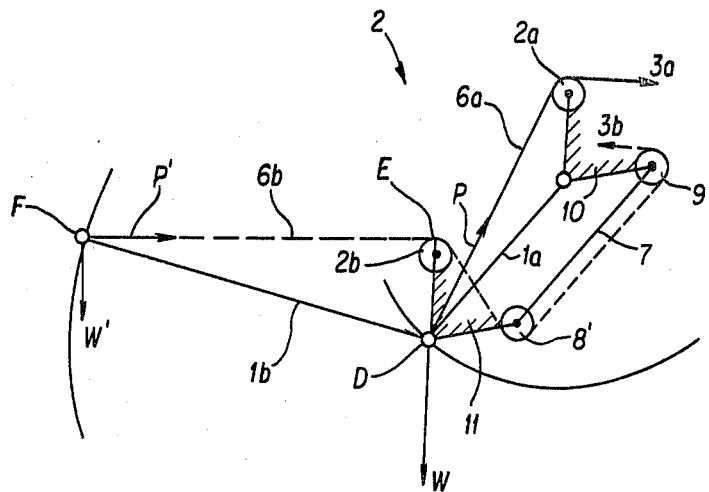
FIG. 3 is a skeleton diagram of a second stage arm assembly according to the present invention.

Turning to FIG. 3, there is illustrated another link spring mechanism which comprises two arms and more particularly a series connection of two of the link spring mechanism of FIG. 2. A first arm $1a$ is connected to a second arm $1b$ at joint D and the link spring mechanism comprises as principal elements a rotary sheave $2b$ pivoted about position E standing upwardly of joint D, a sheave chain including rotary sheaves $8'$ and 9 and a moving sheave (not shown), a spring member (not shown) extending between the moving sheave and a fixing member and a wire $6b$ extending from position F on the center of gravity of the second arm $1b$ through the rotary sheave $2b$ and the sheave chain in the same manner as with the first arm $1a$.

In order that the rotary sheave $2b$ associated with the second arm $1b$ constantly settles in an upper position regardless of the inclination of the arm $1b$ as the rotary sheave $2a$ associated with the first arm $1a$ does, there is provided a four-side or four-joint parallel link mechanism with the first side thereof comprising the first arm $1a$, the second side thereof comprising a link member 7 opposite the first arm $1a$, the third side thereof comprising a fixing member 10 with a vertical segment and the fourth side thereof comprising another fixing member 11 with a vertical segment opposite the third side and the rotary sheave $2b$ is rockingly pivoted about the vertical segment of the fourth side.

It is obvious that three or more of the link mechanism can be combined in the above manner to constitute articulated arms having three or more joints.

It is previously noted that the rotary sheaves 2 in the upper position with respect to the bottom joints of the respective arms within the multi-articulation arm assembly cause out-of-balance state due to gravity according to their radium. The following sets forth an effective measure to offset such error state.

Figure 4:
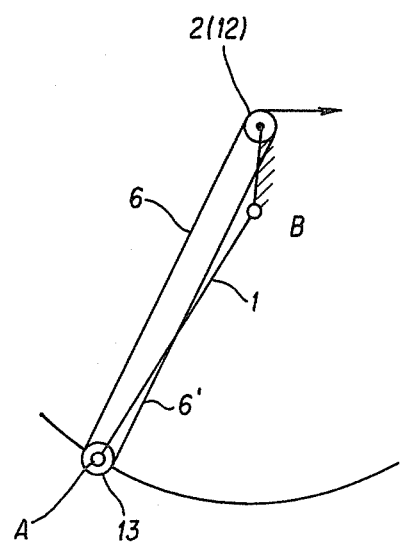
FIG. 4 is a skeleton diagram of a principal part of a sheave system on which a sire is suspended in the arm assembly according to the present invention.

In FIG. 4, a fixed sheave 12 having a diameter equal to that of the rotary sheave 2 is disposed coaxially with the rotary sheave 2, while a rotary sheave 13 with a diameter equal to or approximately equal to that of the rotary sheave 2 is pivoted about a point on the center line of gravity of the first arm 1. The wire 6 is fixedly secured at its one end to the fixed sheave 12 and suspended through the rotary sheave 13 on the rotary sheave 2 and the sheave chain including the rotary and moving sheaves 4 and 5 (see FIG. 2).

The wire 6 extending from the fixed sheave 12 to the rotary sheave 2 through the rotary sheave 13 should take a form of two separate lines 6 and $6'$, and not crossed lines like a crossing sash.

With such an arrangement, the tensions of the two wires 6 and $6'$ act equally on opposite bisections of a working line extending between point A of FIG. 1 or the axis of the rotary sheave 13 and point B of FIG. 1 or the axes of the rotary sheaves 2 and 12 so that the combined tension acts as if it passes between two points A and C, thus keeping a well-balanced state as expected from the theoretical calculations.

It is to be understood that the force and movements of the wire 6 exerted on the sheave chain through the rotary sheave 2 are reduced to half and amplified twice, respectively, as compared with the previously discussed case of FIG. 1. To this end it is required to modify the spring constant of the spring 3 and the number of the sheaves in the chains.

Although it is most desirable to secure both the rotary sheave 2 and the fixed sheave 12 upwardly along a perpendicular extending from the axis of the elbow joint of the arm 1, it is not necessarily necessary to hold the same accurately upwardly of the elbow axis. In the event that the both are slightly spaced away from the perpendicular, the primary object is fully accomplished without any adverse effect.

The basic structures of the gravity-balancing mechanism embodying the present invention have been shown and described in FIGS. 2, 3 and 4. FIGS. 5 and 6 depict an example of unitary and compact arrangement which includes the sheave chain consisting of the rotary sheaves 4 and 8 and the spring member 3. In particular, the rotary sheaves 4 and 8 are respectively pivoted about rotatable parallel shafts at the opposite ends of a framework 14 and the moving sheave 5 is journaled on a bridging shaft 16 slidable between longitudinal slots 15 and 15 formed in an intermediate portion of the framework 14. Between a bearing 17 holding the shaft 16 and a boss 19 engaging with a threaded rod 18 there is suspended the spring member 3.

The above illustrated assembly is excellent in practical aspects. The spring tension may be adjusted when the threaded rod 18 is turned left or right.

As noted earlier, the present invention permits the wire expansion and contraction absorbing mechanism including the spring member extending upwardly along or about the perpendicular with respect to the bottom joint of the arm 1 to work on the wire 6 extending on or about the center of gravity of the arm 1 so as to cancel turning moment in the direction of gravity, thus providing simplicity and labor saving in moving and stopping the arm at any desired position regardless of the vertical swinging movement of the arm.

In addition, since the rotary sheave 2 and the fixed sheave 12 both having the same diameter are coaxially disposed with the wire 6 extending between the aligned rotary and fixed sheaves 2 and 12 and the rotary sheave 13 secured at the working point of the arm in the form of two opposite wires, the force produced by the wire 6 works without causing turning moment. This guarantees the intended gravity counterbalancing performance and thus stability of operation.

As stated above, the arm assembly with the gravity-balancing function as taught by the present invention is capable of exhibiting smooth movements with keeping well-balanced state independently of the gravity and vertical movements of the arm. This assembly has significant advantages in making manual teaching operation simple and enhancing accuracy of reproduction in a servo control system and is suitable for use in a wide variety of industrial robots and automatic devices.

We claim:

1. An arm assembly which functions to balance the weight of an arm by the action of a spring mechanism, wherein said arm assembly comprises:
   a rotary sheave vertically extending directly over the fulcrum of said arm with said rotary sheave being held in a vertical plane regardless of the vertically oscillating movement of said arm; and
   a wire extending from an action point on the center of gravity of said arm over said rotary sheave and is connected to said spring mechanism wherein said spring mechanism has a maximum expansion equal to the distance between the action point and said rotary sheave, thereby counterbalancing the moment produced by the weight of said arm.

2. An arm assembly according to claim 1 wherein said spring mechanism includes a plurality of rotary sheaves fixed therein, a moving sheave and a spring member.

* * * * *